US012769477B1

(12) United States Patent
Allen et al.

(10) Patent No.: US 12,769,477 B1
(45) Date of Patent: Oct. 20, 2026

(54) MEMORY ACCESS PATTERN TRUNCATION ALONG MOST-SIGNIFICANT DIMENSION

(71) Applicant: Amazon Technologies, Inc., Seattle, WA (US)

(72) Inventors: Hayden Stone Allen, Seattle, WA (US); Xin Liu, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 28 days.

(21) Appl. No.: 19/076,800

(22) Filed: Mar. 11, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ............................ G06F 3/0655; G06F 3/0604
See application file for complete search history.

(56) References Cited

U.S. PATENT DOCUMENTS

2022/0147328 A1* 5/2022 Brown ................ G06F 12/0842
2025/0045120 A1* 2/2025 Rozin ................. G06F 12/0862
2025/0156109 A1* 5/2025 Shi ........................ G06F 3/0655

* cited by examiner

*Primary Examiner* — Nicholas A. Paperno
(74) *Attorney, Agent, or Firm* — Kilpatrick Townsend & Stockton LLP

(57) ABSTRACT

Techniques are disclosed for truncating memory access patterns to minimize unnecessary memory accesses. A write access pattern for an instruction from a set of memory access instructions is determined. The write access pattern indicates which of a set of memory elements of a memory region of a memory are written to during execution of the instruction. One or more read access patterns are determined that indicate which of the set of memory elements of the memory region are read from during execution of the set of memory access instructions. A most-significant dimension for the write access pattern is computed. A maximum read index of the set of memory elements that is read from by the one or more read access patterns is identified. The write access pattern is truncated along the most-significant dimension at or after the maximum read index to generate a truncated write access pattern.

20 Claims, 12 Drawing Sheets

MEMORY ACCESS PATTERN TRUNCATION ALONG MOST-SIGNIFICANT DIMENSION

BACKGROUND

Certain computer programs, such as machine learning programs, operate on large amounts of data stored in memory in the form of multi-dimensional arrays or tensors. These programs execute sequences of instructions that read, write, and manipulate data, often accessing multiple memory elements simultaneously rather than one at a time. To achieve this, programs can rely on memory access patterns, which define how data is retrieved and stored in memory. These patterns can be important for managing the complexity of tensor-based operations and ensuring efficient execution on hardware accelerators designed for machine learning tasks.

BRIEF DESCRIPTION OF THE DRAWINGS

Various embodiments in accordance with the present disclosure will be described with reference to the drawings, in which.

DETAILED DESCRIPTION

Figure 1:
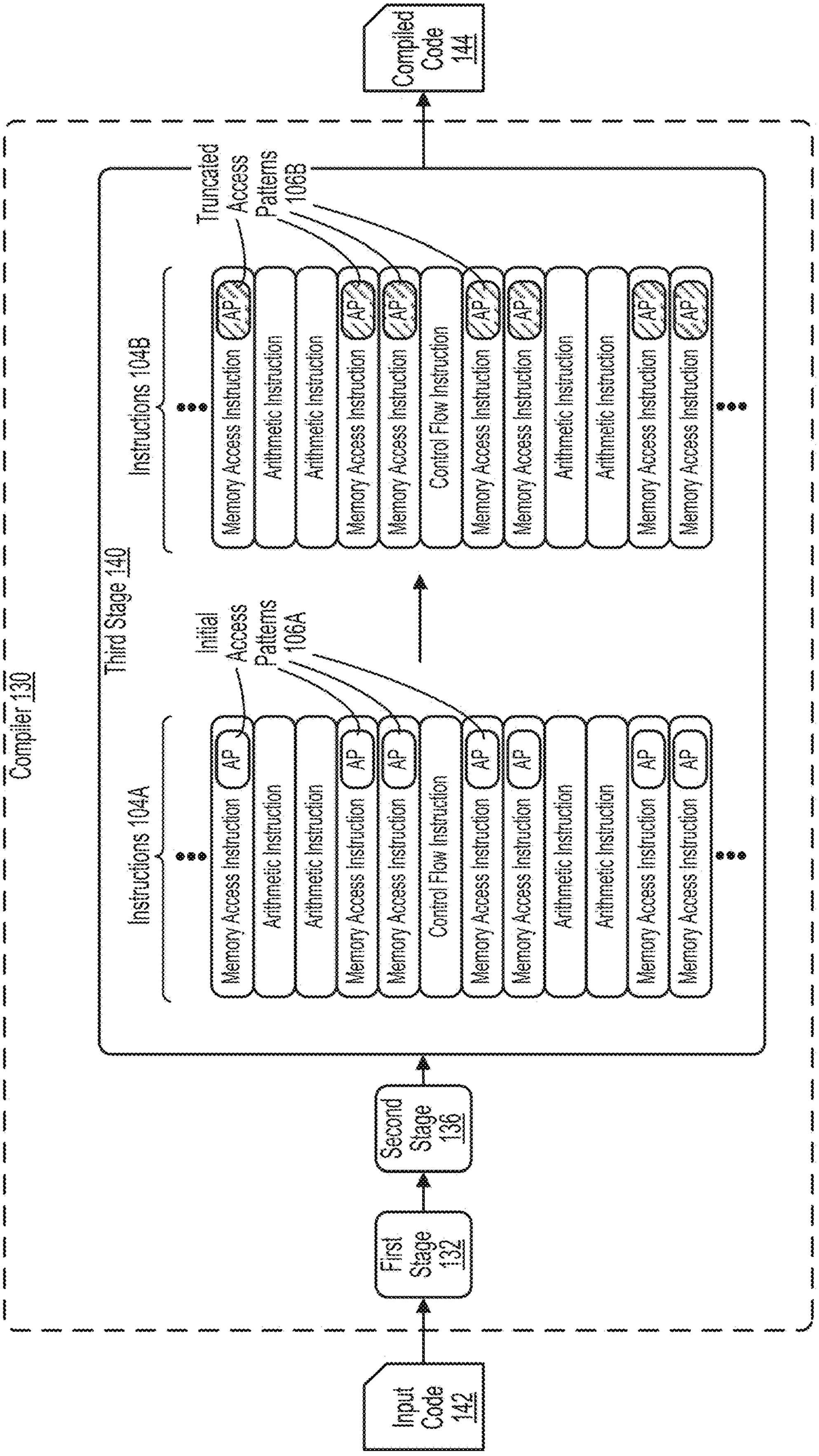
FIG. 1 illustrates an example of a compiler that converts input code into compiled code.

Memory access patterns provide compact and structured representations of how data is accessed in multi-dimensional tensors. Instead of explicitly listing every index to be accessed, access patterns use equations or abstractions to represent entire sets of indices. This approach reduces the complexity of memory management and enables optimizations such as parallel access to memory partitions. These benefits are particularly important for machine learning accelerators, where efficient memory usage enables high throughput and low latency.

However, a challenge arises when memory access patterns are used to write to memory elements that are never read. This inefficiency often occurs because write operations may not be precisely aligned with the actual data requirements of subsequent read instructions. For example, an access pattern might write more elements than are ultimately needed, resulting in unnecessary memory operations that waste time and resources. This issue is exacerbated in hardware architectures with partitioned memory, where each write operation impacts multiple memory partitions simultaneously, causing the amount of wasted resources per partition to be multiplied by the total number of partitions.

Embodiments of the present disclosure address these and other issues by providing a method for truncating memory access patterns to minimize unnecessary memory accesses. The method may be implemented by a compiler during compilation of input code into machine instructions. The compiler can analyze the memory elements that are actually read from to compute a maximum read index. The compiler can further identify the most-significant dimension in the access pattern, which is the dimension of the access pattern with the largest step size, or the dimension having the largest number of memory elements between successive memory accesses. The memory access pattern of a write instruction is then truncated along the most-significant dimension at or just after the maximum read index, ensuring that only the required data is written to memory. This optimization not only reduces wasted memory operations but also improves overall performance and resource efficiency in machine learning accelerators, making it a valuable advancement for modern hardware architectures.

Some embodiments of the present disclosure may include a system for optimizing memory access patterns during code compilation. The system may include a host processor and a storage medium storing a compiler. The compiler translates input programming code into executable machine code for a target processor. The target processor is coupled to a memory divided into different memory regions, with each memory region including specific memory elements. The compiler generates instructions from the input code, including memory access instructions. For these instructions, it analyzes how memory is accessed by determining the initial write access pattern (which parts of memory are written to) and the initial read access pattern (which parts are read). It identifies the most significant dimension in the write access pattern, defined as the dimension with the largest step size (the number of memory elements skipped between consecutive accesses). The compiler also determines the maximum memory element index accessed by all of the read access patterns in the program. Based on this, the write pattern is truncated along the most-significant dimension at or after the maximum read index, ensuring few if any unnecessary memory writes are performed. The final compiled code includes these optimized memory access instructions.

The system can also include the target processor and its memory, where the target processor executes the compiled code with the truncated access patterns. The initial write access pattern consists of a step size and an access number for each dimension, and the most significant dimension is identified as the dimension having the largest step size. Additionally, the compiler can adjust one of the read access patterns along its most significant dimension to ensure the total number of memory elements read matches those written. Some embodiments may include a method for implementing this process. The method involves determining the write and read access patterns for memory access instructions, identifying the most significant dimension of the write access pattern, finding the maximum memory element index accessed by any read access pattern for the given memory location, and truncating the write and read access patterns accordingly. This method ensures efficient memory usage by aligning memory writes with actual read requirements.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example of a compiler 130 that converts input code 142 into compiled code 144. Compiler 130 may run on a host system. Input code 142 may be written in a human-readable language and compiled code 144 may include machine instructions that are executable on a target processor. In the example of FIG. 1, compiler 130 includes a first stage 132, a second stage 136, and a third stage 140, which each perform different operations to produce compiled code 144. In other examples, compiler 130 can combine the operations of first stage 132, second stage 136, and/or third stage 140 into fewer stages, or can divide the operations of one of the stages into multiple stages.

First stage 132 can receive and process input code 142. Input code 142 can describe a program in a high-level programming language, such as Java, C++, or Tensorflow, among many other examples. Input code 142 can describe, for example, steps to perform image recognition, speech recognition, machine translation, or other operations. Input code 142 can be obtained, for example, from a storage device and can be loaded into the memory of the host system. Processing of input code 142 can include sorting the operations described in input code 142 into layers, where the outputs of one layer provide the inputs to a next layer.

The output of first stage 132 can be organized, for example, in the layers, nodes, and connections between nodes of a neural network. Second stage 136 can perform intermediate processing on this output 134. For example, the operations performed in any one layer, or at any one node in a layer, may be too many for the target processor to perform at the same time. The target processor may, for example, have a limited amount of local storage space for the data needed for a computation, or the computations may be more than the target processor can perform at one time. In this example, second stage 136 can break the operations of the layer or node down into smaller operations, which can fit into the target processor's local memory and/or can fit into the computing capacity of the target processor. Processing of the output of first stage 132 during second stage 136 can include other steps, such as scheduling, or determining the order in which the target processor will perform operations, among other examples.

In various examples, the output of second stage 136 includes the various steps to be performed by components of the target processor, in the order that the steps are to be performed. The output can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 140 can operate on the output of second stage 136, and perform various steps before producing compiled code 144 that are to be executed by the target processor. These steps can include, for example, removing redundant dependencies, resolving or handling dependencies between nodes by inserting synchronization instructions into the code, identifying possible optimizations in memory usage or memory bandwidth usage, and other operations. In some examples, during third stage 140, compiler may generate a set of instructions 104A that include memory access instructions (e.g., read and write instructions), arithmetic instructions, control flow instructions, among other possibilities.

Each of the memory access instructions in instructions 104A may include an initial memory access pattern 106A that indicates the sequence and structure of how memory elements of a memory are accessed. For example, the access pattern may comprise an equation or a compact set of numbers that represent all of the desired memory element indices. Each of initial memory access patterns 106A may be either a write access pattern, which indicates the sequence and structure of the memory elements written to by a write instruction, or a read access pattern, which indicates the sequence and structure of the memory elements read from by a read instruction. Each of initial memory access patterns 106A may include a plurality of dimensions. In various examples, one or more of initial memory access patterns 106A may include at least 3, at least 4, or at least 5 dimensions. In some examples, each of initial memory access patterns 106A may include between 2 and 5 dimensions.

During third stage 140, compiler 130 may analyze the memory access instructions of instructions 104A to perform an access pattern truncation process as described herein. As a result of performing the access pattern truncation process, one or more of initial memory access patterns 106A may be truncated to generate truncated access patterns 106B, thereby forming a modified set of instructions 104B. The access pattern truncation process may include a set of steps that are performed for each memory access instruction, for each write instruction, for each read instruction, or for each region of memory that is written to, among other possibilities.

Figure 2:
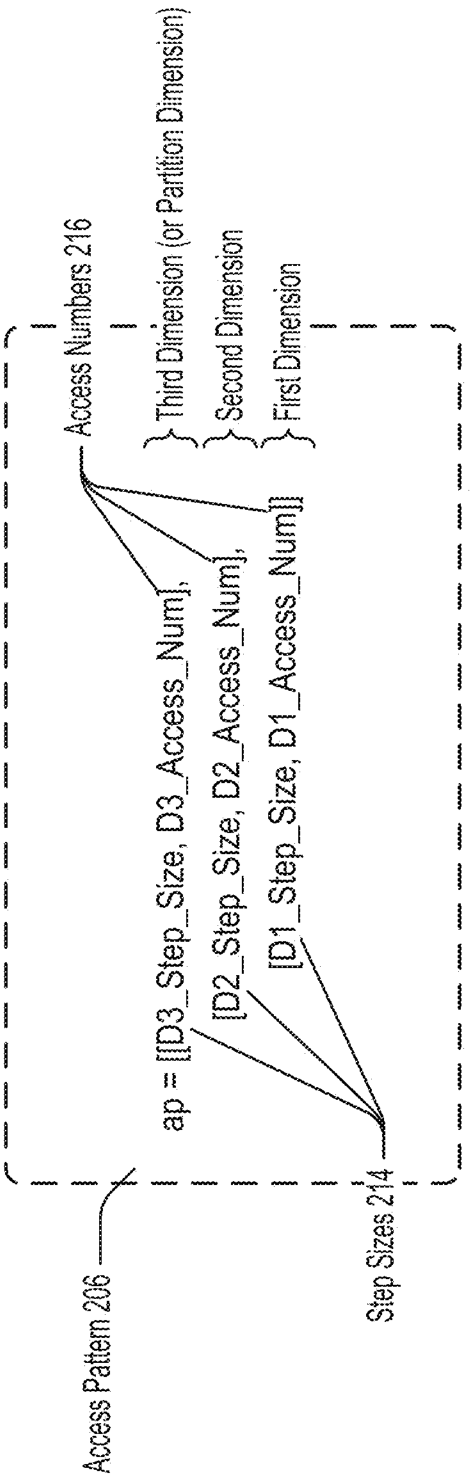
FIG. 2 illustrates an example structure of a memory access pattern with 3 dimensions.

FIG. 2 illustrates an example structure of a memory access pattern 206 with 3 dimensions. Each dimension includes two numbers, the first number is a step size 214 and the second number is an access number 216. The step size for a particular dimension (e.g., D1_Step_Size, D2_Step_Size, D3_Step_Size) indicates the number of memory elements that are skipped between successive memory accesses in the particular dimension. The access number for a particular dimension (e.g., D1_Access_Num, D2_Access_Num, D3_Access_Num) indicates the number of memory accesses in the particular dimension.

Figure 3:
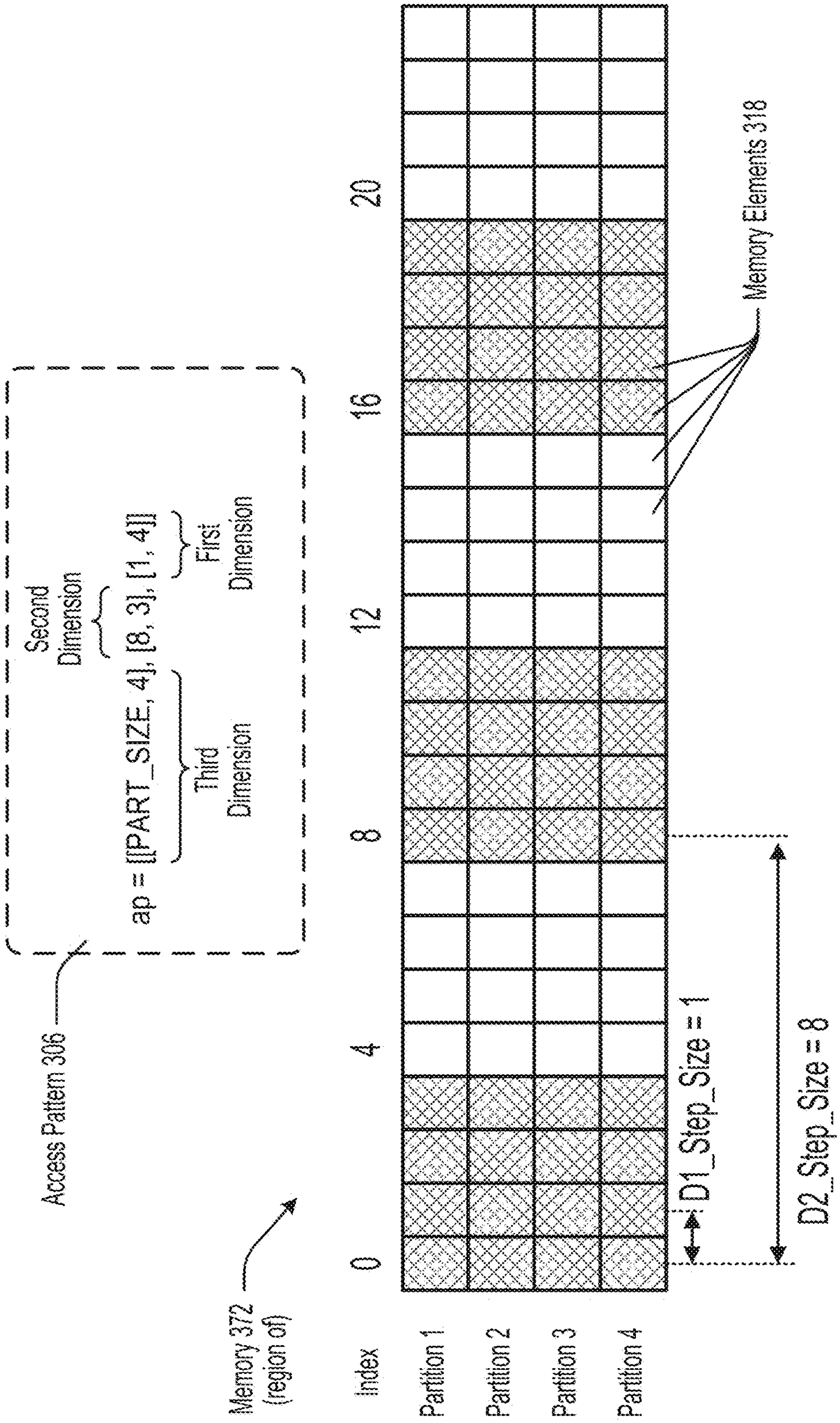
FIG. 3 illustrates an example region of a memory and an example three-dimensional access pattern.

FIG. 3 illustrates an example region of a memory 372 and an example three-dimensional access pattern 306. Memory 372 includes a set of memory elements 318 across 4 partitions. Memory elements 318 that are shaded indicate memory elements that are accessed by access pattern 306. In the first dimension, access pattern 306 has an access number of 4 and a step size of 1, forming a group of 4 contiguous memory elements between indices 0 and 3 for each partition. In the second dimension, access pattern 306 has an access number of 3 and a step size of 8, forming 3 separate copies of the 4 memory elements in the first dimension and placing them 8 memory elements apart. In the third dimension, access pattern 306 has an access number of 4, forming 4 separate copies of the memory elements in the second and first dimensions across the 4 partitions.

In some cases, an access pattern can be read from right to left. This can correspond to reading a nest of loops from inside out. In this case, the right-most dimension is [1, 4], meaning "access 4 elements, jumping over 1 element each time". The next dimension is [8, 3], meaning "perform everything to the right 3 times, and jump over 8 elements each time". Finally, the left-most dimension is [PART_SIZE, 4], meaning "perform everything to the right 4 times, and jump over PART_SIZE elements each time". In some cases, the left-most dimension can be referred to as the partition dimension.

The different indices of an access pattern can be obtained via a nest of loops as shown below. In this example, each dimension corresponds to a loop. The table shown below shows the computed indices for different combinations of j and k for i=0.

```
for i in range (D3_Access_Num)
  for j in range (D2_Access_Num)
    for k in range (D1_Access_Num)
      index=i*D3_Step_Size+j*D2_Step_Size+
        k*D1_Step_Size
```

| i | j | k | Index |
|---|---|---|---|
| 0 | 0 | 0 | 0 |
| 0 | 0 | 1 | 1 |
| 0 | 0 | 2 | 2 |
| 0 | 0 | 3 | 3 |
| 0 | 1 | 0 | 8 |
| 0 | 1 | 1 | 9 |
| 0 | 1 | 2 | 10 |
| 0 | 1 | 3 | 11 |
| 0 | 2 | 0 | 16 |
| 0 | 2 | 1 | 17 |
| 0 | 2 | 2 | 18 |
| 0 | 2 | 3 | 19 |

Figure 4A:
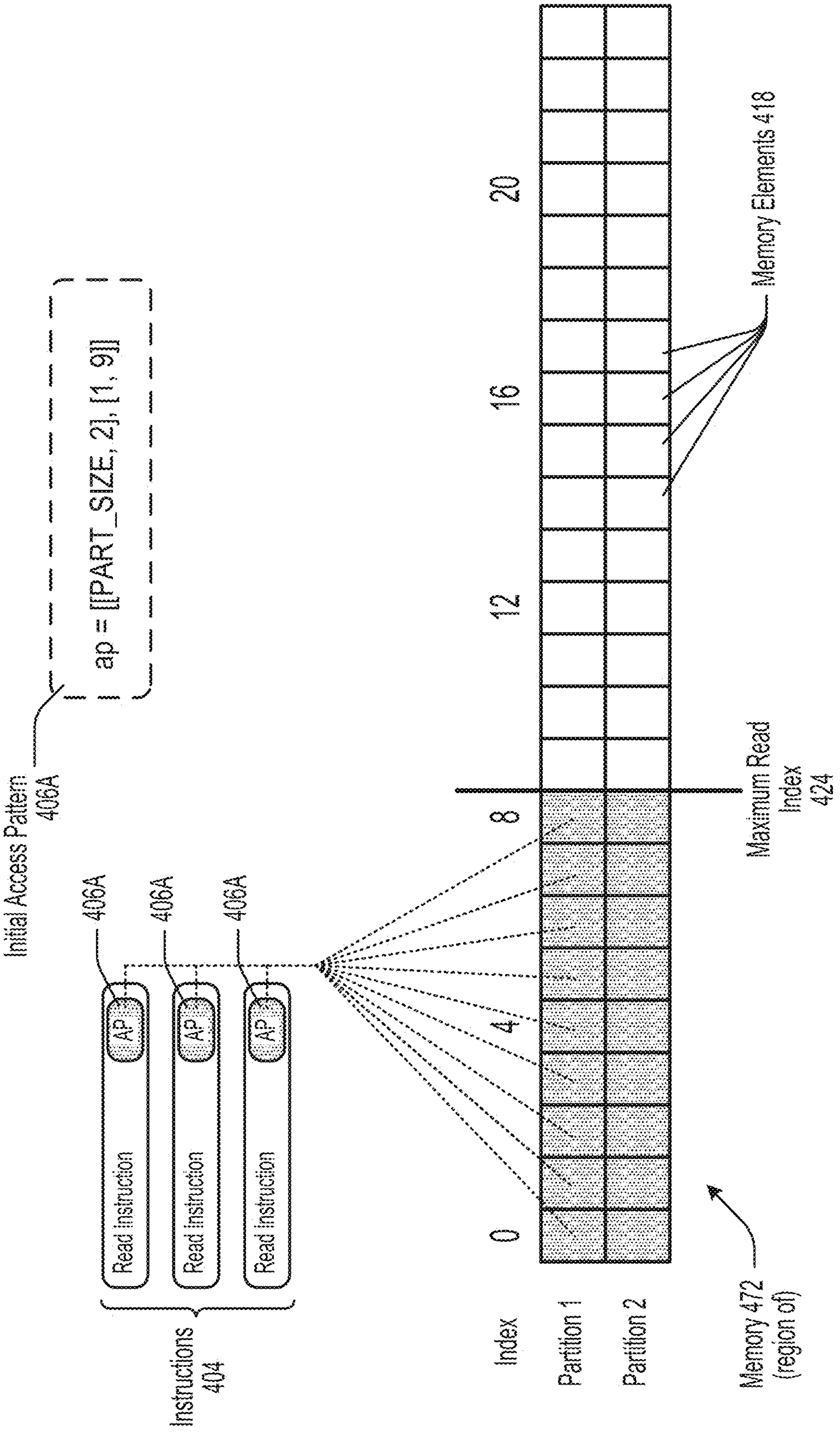
FIG. 4A illustrates an example region of a memory and example initial access patterns of a set of instructions.

FIG. 4A illustrates an example region of a memory 472 and example initial access patterns 406A of a set of instructions 404. In the illustrated example, each of instructions 404 is a read instruction having a read access pattern that reads the subset of memory elements 418 from indices 0 to 8 (inclusive) across 2 partitions. In some examples, the access pattern truncation process may include the step of identifying a maximum read index 424, which is the largest index of all the memory elements that are read from. In some cases, the corresponding memory element may be referred to as the "maximum read element". In the illustrated example, maximum read index 424 of access patterns 406A is equal to 8.

Figure 4B:
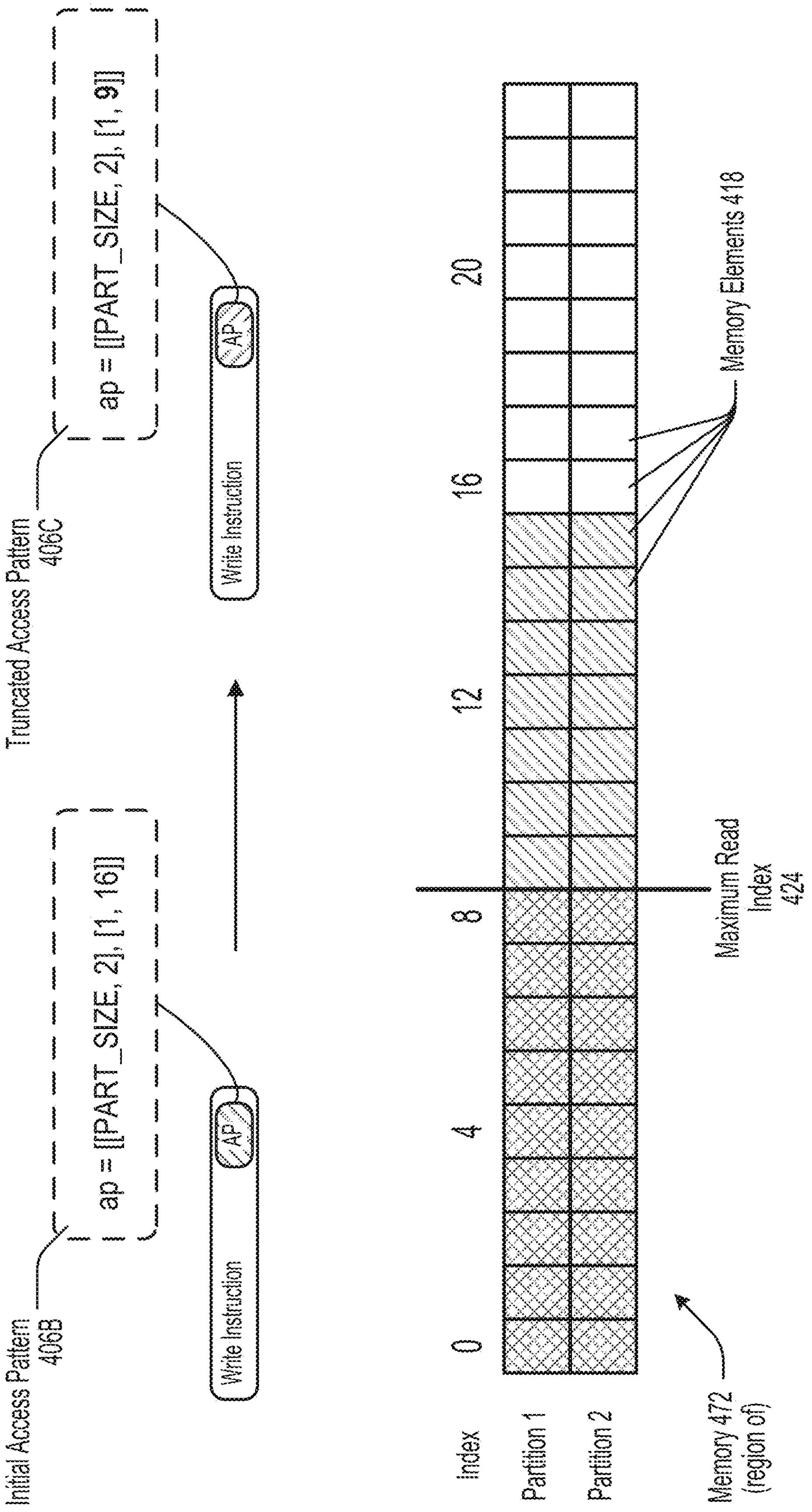
FIG. 4B illustrates an example truncation of an initial access pattern of a write instruction.

FIG. 4B illustrates an example truncation of an initial access pattern 406B of a write instruction, alternatively referred to as a "write access pattern". In some examples, the access pattern truncation process may include the step of determining the memory access pattern of a write instruction and performing a comparison with maximum read index 424. The access pattern truncation process may include the step of truncating the write access pattern at or after maximum read index 424. In the illustrated example, because both access pattern 406A for the read instructions and access pattern 406B for the write instruction are contiguous, access pattern 406B can be truncated at exactly maximum read index 424 by decreasing the access number in the first dimension from 16 to 9, resulting in a truncated access pattern 406C. It can be observed that truncated access pattern 406C prevents any wasted write operations during runtime.

Figure 4C:
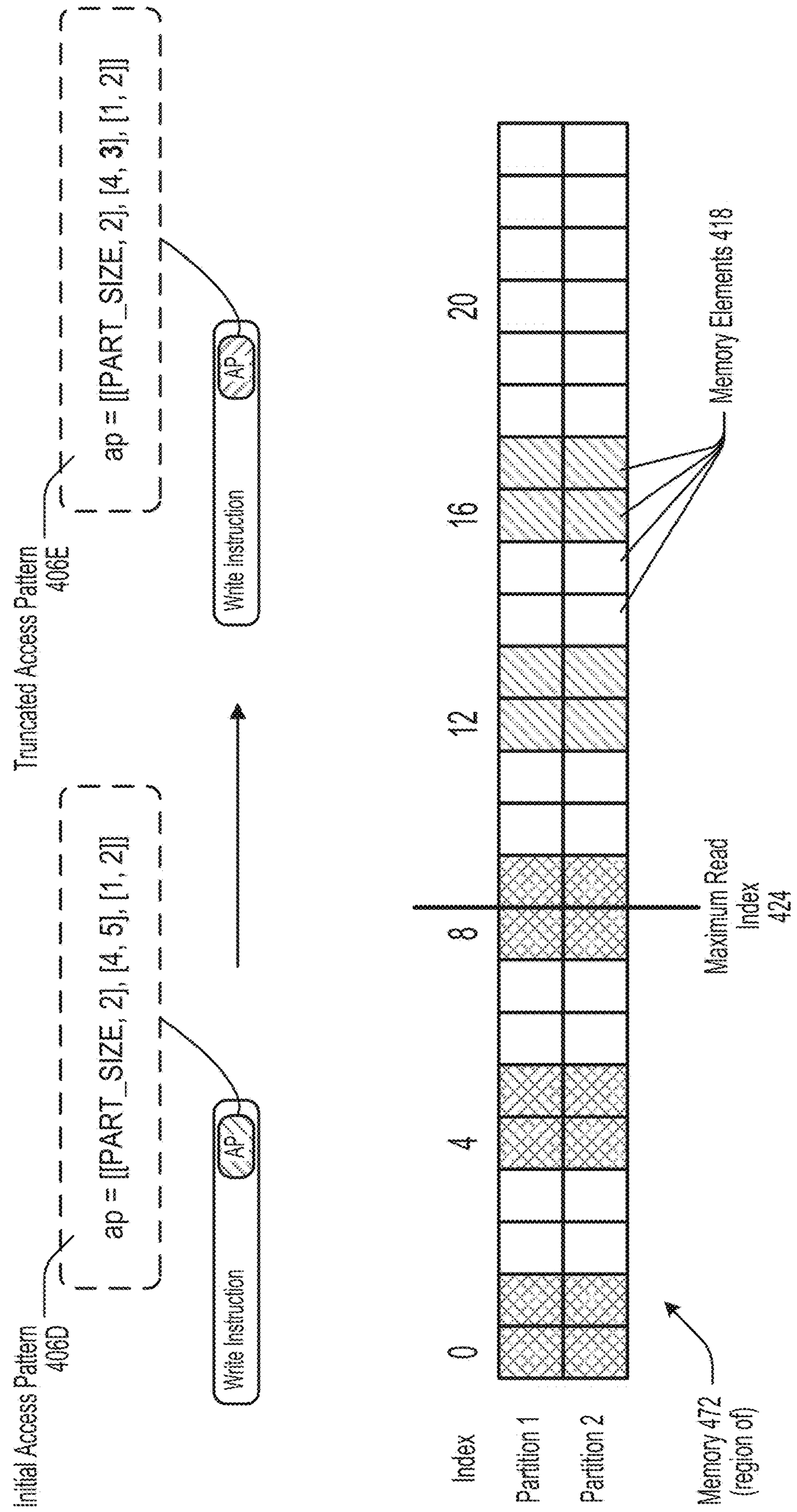
FIG. 4C illustrates an example truncation of an initial access pattern of a write instruction.

FIG. 4C illustrates an example truncation of an initial access pattern 406D of a write instruction. The access pattern truncation process may include the step of truncating the write access pattern at or after maximum read index 424. Since access pattern 406D for the write instruction is not contiguous, truncation at exactly maximum read index 424 is not guaranteed to be possible. Instead, the access pattern truncation process may include the step of determining the most-significant dimension for access pattern 406D. This is accomplished by identifying the dimension having the maximum step size, which is the second dimension (4>1) in the illustrated example. In some examples, the partition dimension is not considered when identifying the dimension having the maximum step size.

Next, the access pattern truncation process may include the step of computing a minimum access number for the write access pattern in the most-significant dimension. The minimum access number is such that, if the corresponding access number is decreased to the minimum access number, the write access pattern would still write to at least the maximum read index. In the illustrated example, the minimum access number in the most-significant dimension is 3. As such, access pattern 406D can be truncated after maximum read index 424 by decreasing the access number in the second dimension from 5 to the minimum access number of 3, resulting in a truncated access pattern 406E. It can be observed that truncated access pattern 406D prevents 4 wasted write operations and allows 1 wasted write operation in each partition during runtime.

Figure 5A:
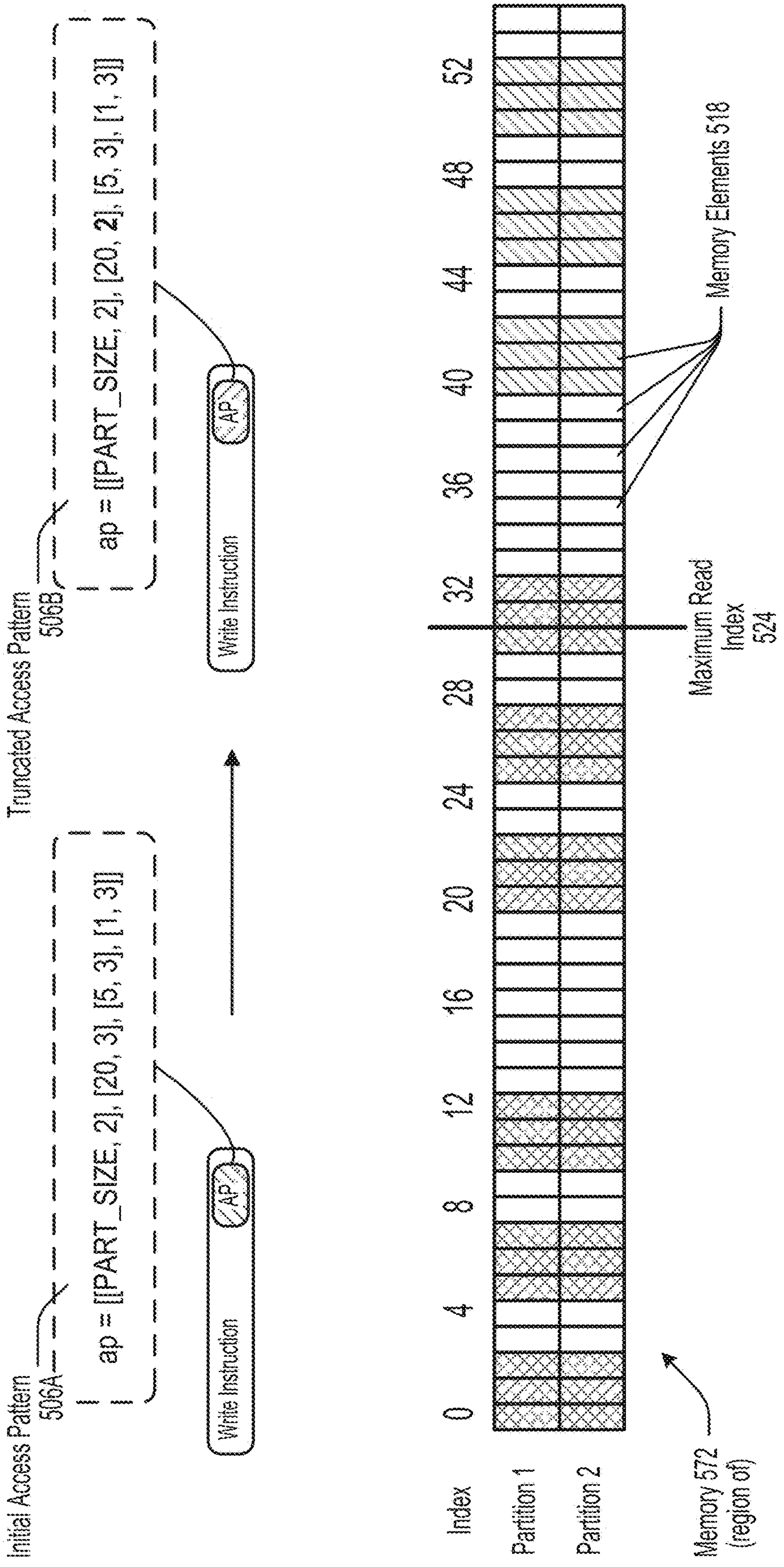
FIG. 5A illustrates an example region of a memory and an example truncation of an initial access pattern of a write instruction.

FIG. 5A illustrates an example region of a memory 572 and an example truncation of an initial access pattern 506A of a write instruction. Memory 572 includes a set of memory elements 518 across 2 partitions, and access pattern 506A includes 4 dimensions. The access pattern truncation process may include the step of truncating the write access pattern at or after a maximum read index 524 (having been previously determined using one or more read access patterns), which is equal to 30. Since access pattern 506A for the write instruction is not contiguous, truncation at exactly maximum read index 524 is not guaranteed to be possible. Instead, the access pattern truncation process may include the step of determining the most-significant dimension for access pattern 506A. This is accomplished by identifying the dimension having the maximum step size, which is the third dimension (20>5>1) in the illustrated example.

Next, the access pattern truncation process may include the step of computing a minimum access number for the write access pattern in the most-significant dimension. The minimum access number is such that, if the corresponding access number is decreased to the minimum access number, access pattern 506A would still write to at least maximum read index 524. In the illustrated example, the minimum access number in the most-significant dimension is 2. As such, access pattern 506A can be truncated after maximum read index 524 by decreasing the access number in the third dimension from 3 to the minimum access number of 2, resulting in a truncated access pattern 406B. It can be observed that truncated access pattern 406B prevents 9 wasted write operations and allows 2 wasted write operations in each partition during runtime.

Figure 5B:
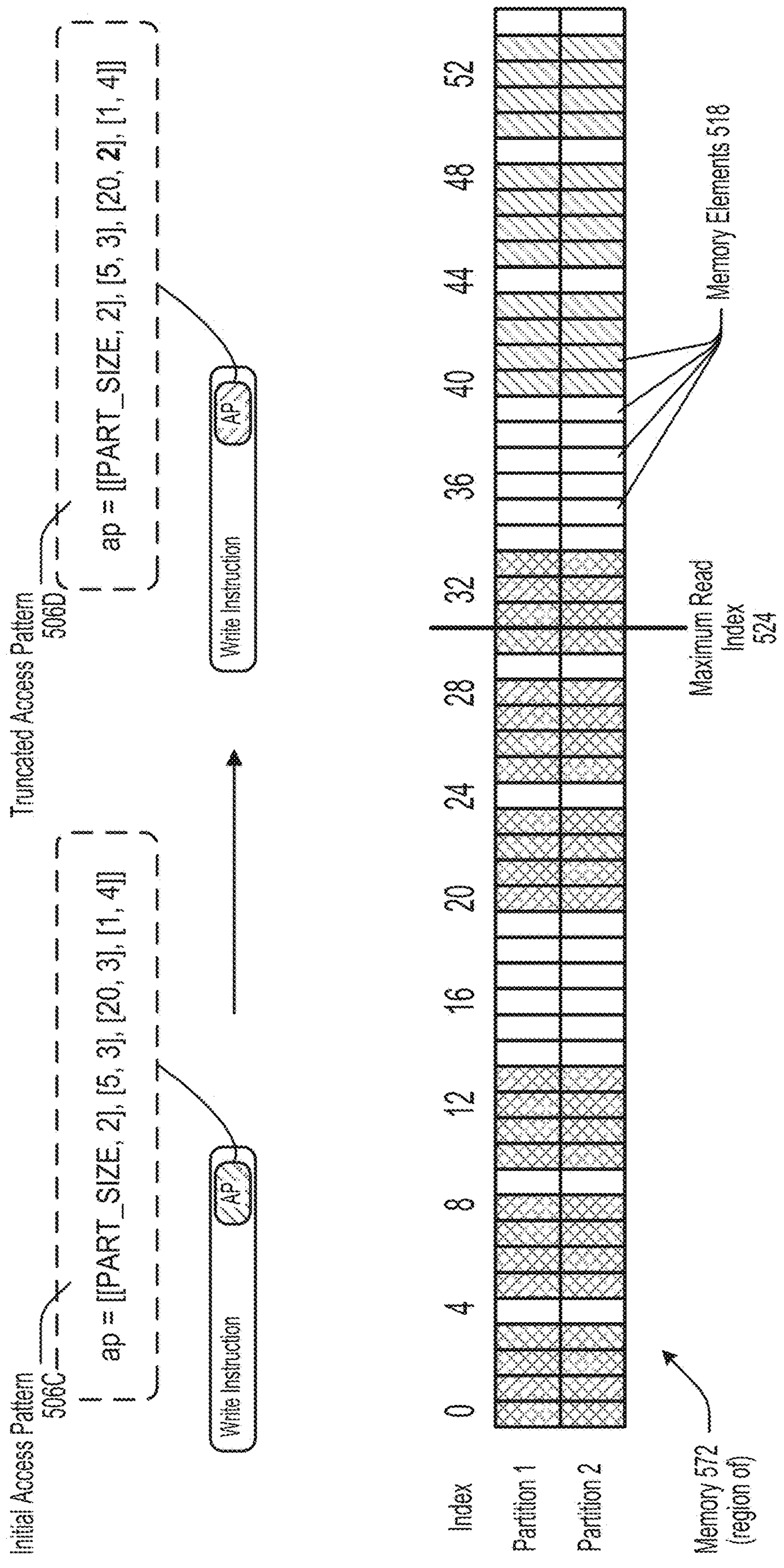
FIG. 5B illustrates an example truncation of an initial access pattern of a write instruction at a region of a memory.

FIG. 5B illustrates an example truncation of an initial access pattern 506C of a write instruction at the region of memory 572. The access pattern truncation process may include the step of truncating the write access pattern at or after maximum read index 524, which is equal to 30. Since access pattern 506C for the write instruction is not contiguous, truncation at exactly maximum read index 524 is not guaranteed to be possible. Instead, the access pattern truncation process may include the step of determining the most-significant dimension for access pattern 506C. This is accomplished by identifying the dimension having the maximum step size, which is the second dimension (20>5>1) in the illustrated example.

Next, the access pattern truncation process may include the step of computing a minimum access number for the write access pattern in the most-significant dimension. The minimum access number is such that, if the corresponding access number is decreased to the minimum access number, access pattern 506C would still write to at least maximum read index 524. In the illustrated example, the minimum access number in the most-significant dimension is 2. As such, access pattern 506C can be truncated after maximum read index 524 by decreasing the access number in the second dimension from 3 to the minimum access number of 2, resulting in a truncated access pattern 406D. It can be observed that truncated access pattern 406D prevents 12 wasted write operations and allows 3 wasted write operations in each partition during runtime.

Figure 6:
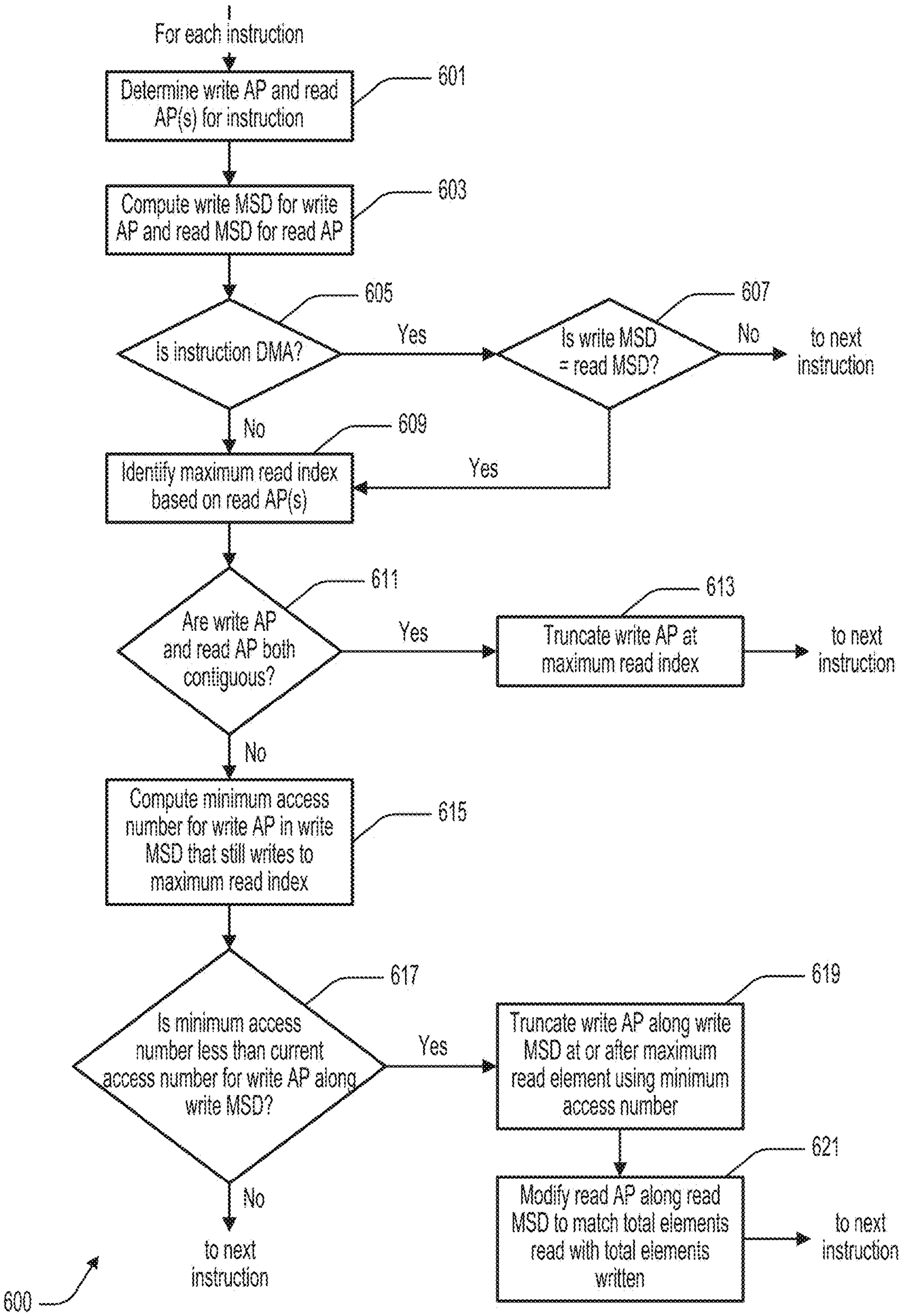
FIG. 6 illustrates an example of an access pattern truncation process.

FIG. 6 illustrates an example of an access pattern truncation process 600. Steps of process 600 may be performed by a compiler running on a host system. Steps of process 600 may be performed in a different order than the illustrated example, and one or more steps of process 600 may be optionally performed. One or more steps of process 600 may be performed by one or more processors, such as those included in a host system. Steps of process 600 may be performed for each instruction of a set of memory access instructions having been previously generated by the compiler based on input code.

At step 601, an initial write access pattern is determined for the instruction. The initial write access pattern may indicate which of a set of memory elements of a memory region of a memory are written to during execution of the instruction. In some examples, at step 601, one or more initial read access patterns are determined for one or more read instructions that read from the memory region. The one or more initial read access patterns may indicate which of the set of memory elements of the memory region are read from during execution of the set of memory access instructions.

At step 603, the most-significant dimension for the initial write access pattern is determined. The most-significant dimension for the initial write access pattern may be computed as the dimension with the maximum step size. In some examples, at step 603, the most-significant dimension for an initial read access pattern of the initial read access patterns is computed. The most-significant dimension for the initial read access pattern may be computed as the dimension with the maximum step size.

At step 605, it is determined whether the instruction is a DMA instruction. If it is determined that the instruction is a DMA instruction, then process 600 proceeds to step 607. If it is determined that the instruction is not a DMA instruction, then process 600 proceeds to step 609. In some examples, it may only be beneficial to truncate access patterns for DMA instructions when both read and write access patterns can be truncated along the same dimension.

At step 607, it is determined whether the most significant dimension for the initial write access pattern is equal to the most significant dimension for the initial read access pattern. If it is determined that they are equal, then process 600 proceeds to step 609. If it is determined that they are not equal, process 600 returns to step 601 with the next instruction.

At step 609, a maximum read index of a maximum read element of the set of memory elements that is read from by the one or more initial read access patterns is identified.

At step 611, it is determined whether the initial write access pattern and the initial read access pattern are both contiguous. If it is determined that they are both contiguous, process 600 proceeds to step 613. If it is determined that they are not both contiguous, process 600 proceeds to step 615.

At step 613, the initial write access pattern is truncated along the most-significant dimension for the initial write access pattern at the maximum read index to generate a truncated write access pattern. After performing step 613, process 600 returns to step 601 with the next instruction.

At step 615, a minimum access number for the initial write access pattern in the most-significant dimension for the write access pattern is computed. The minimum access number is the lowest access number that allows the initial write access pattern to still write to the maximum read index.

At step 617, it is determined whether the minimum access number is less than a current access number for the initial write access pattern in the most-significant dimension for the write access pattern. If the minimum access number is less than the current access number, then process 600 proceeds to step 619. If the minimum access number is not less than the current access number, then process 600 returns to step 601 with the next instruction.

At step 619, the initial write access pattern is truncated along the most-significant dimension for the initial write access pattern using the minimum access number at or after the maximum read index to generate a truncated write access pattern. In some examples, step 619 may include truncating the initial write access pattern at exactly the maximum read index. In some examples, step 619 may include truncating the initial write access pattern at an index after the maximum read index. In some examples, step 619 may include finding a value between the minimum access number and the initial access number such that there exists a new access number for the initial read access pattern in the most-significant dimension for the initial read access pattern to match a total number of memory elements read with a total number of memory elements written. The initial write access pattern may then be truncated using this value.

At step 621, the initial read access pattern is modified (e.g., truncated) along the most-significant dimension for the initial read access pattern using the new access number computed in step 621. Modifying the initial read access pattern allows the total number of memory elements read to equal the total number of memory elements written. After performing step 621, process 600 returns to step 601 with the next instruction.

Figure 7:
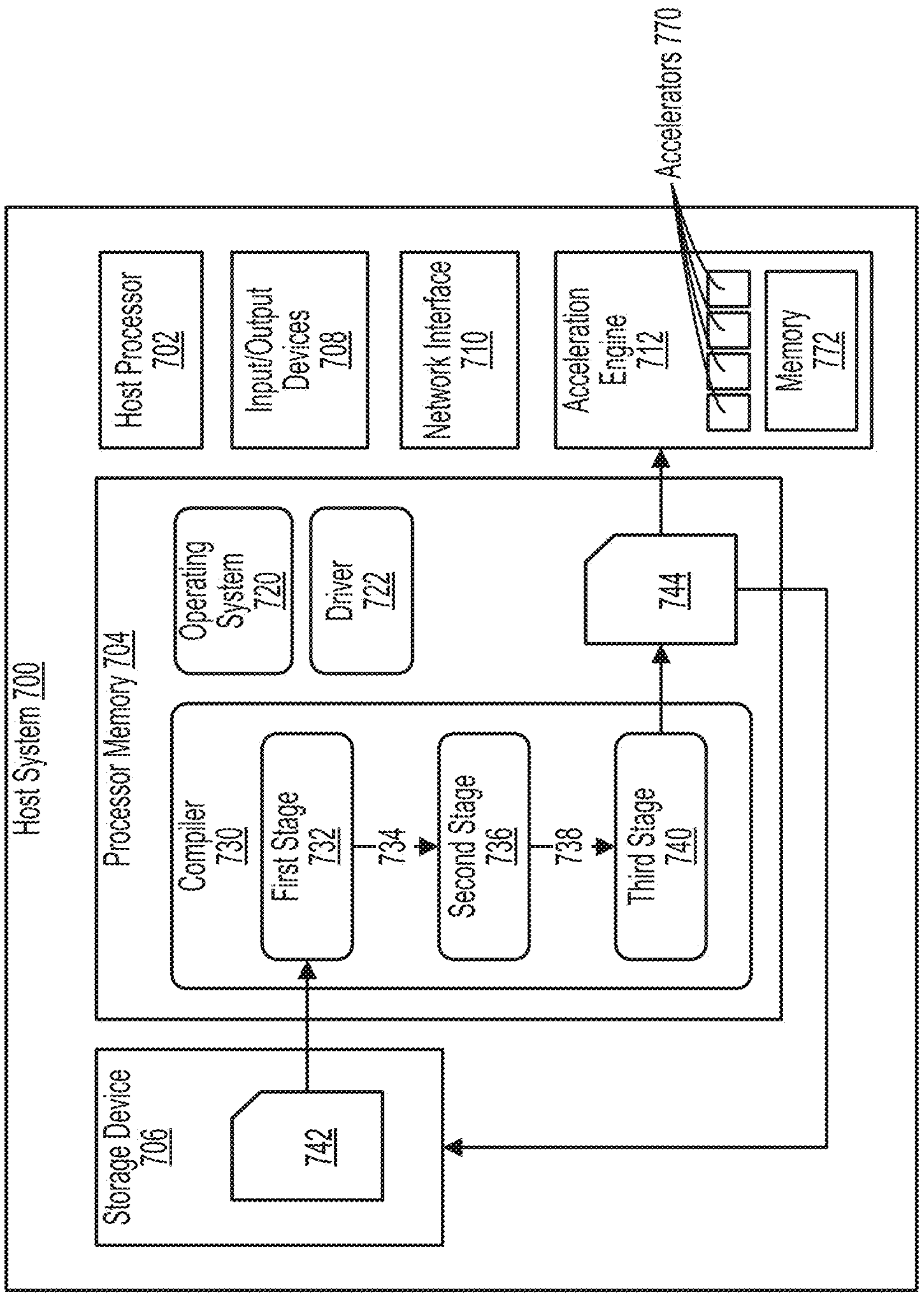
FIG. 7 illustrates an example of a host system on which a compiler can run.

FIG. 7 illustrates an example of a host system 700 on which a compiler 730 can run. The illustrated host system 700 is an example of a computing device, and includes a host processor 702, a processor memory 704, at least one storage device 706, various Input/Output (I/O) devices 708, and at least one network interface 710. In the example of FIG. 7, host system 700 also includes an acceleration engine 712, which is an integrated circuit device that can accelerate certain operations or computations performed by host system 700. In various examples, host system 700 can be implemented as a server in a data center, a desktop computer, a laptop computer, a tablet computer, or a smartphone, among other examples. In some examples, operations or components discussed below as performed or included in host system 700 can be performed or included in other computer devices. For example, compiler 730 can execute on host system 700 while acceleration engine 712 is located at a different host system.

Host processor 702 is an integrated circuit device that can execute program code, in the form of instructions. The program code can be used for various software applications or tools, such as an operating system 720 or compiler 730. While host processor 702 is executing a program, the instructions for the program can be stored in processor memory 704. The instructions can also be stored elsewhere, such as on storage device 706, and can be loaded into processor memory 704 when needed by host processor 702. Host processor 702 can also use processor memory 704 for temporary storage of other data on which host processor 702 is operating. In various examples, processor memory 704 is a volatile memory type, such as a type of Random Access Memory, though non-volatile memory types can, alternatively or additionally, be used for processor memory 704.

Storage device 706 is an example of a device that can include non-volatile memory. For example, storage device 706 can be a magnetic disk drive, a solid state drive, or an optical drive, among other examples. Storage device 706 can further be non-transitory, such that program code and other data stored on storage device 706 remains present when storage device 706 is not powered on.

Storage device 706 is one example of a peripheral device, which are components that can be coupled to host system 700 to add functionality to host system 700. Other examples of peripheral devices include Input/Output devices 708 and network interface 710. Input/Output devices 708 can include user input and output devices, such as keyboards, mice, touch screens, microphones, display screens, speakers, printers, and scanners, among other examples. Network interface 710, which can be implemented using a network interface card, can provide access to one or more networks. Network interface 710 can include, for example, a physical port for connecting a network cable and/or wireless antennas for communicating with Wi-Fi and/or cellular networks. Network interface 710 can also be described as an I/O device.

Acceleration engine 712 is also another type of peripheral device or I/O device. Acceleration engine 712 is a device that is purpose built to perform certain operations that can be performed by host processor 702, but can be performed faster by acceleration engine 712. For example, acceleration engine 712 can include one or more neural network accelerators 770, and, as such, may be able to perform the large scale, parallel computations of a neural network more efficiently than when the computations are performed by host processor 702. As another example, acceleration engine 712 can be a GPU, and may be optimized to perform the computations needed for graphics rendering. Other examples of devices that can be implemented by acceleration engine 712 include cryptographic accelerators, compression and decompression accelerators, 3-D accelerators, regular expression accelerators, security accelerators, and others.

In various examples, acceleration engine 712 can execute program code to perform certain operations. For example, when acceleration engine 712 includes one or more neural network accelerators 770, acceleration engine 712 can be programmed to execute a particular neural network, such as one that performs image recognition or one that performs machine translation. As a further example, to support the execution of a neural network, acceleration engine 712 can be programed to perform operations such as copying data for the neural network from processor memory 704 (for example) into acceleration engine 712, copying input data for the neural network from processor memory 704 into acceleration engine 712, and/or copying results from acceleration engine 712 into processor memory 704, among other examples.

To generate program code for acceleration engine 712, in various examples, host system 700 can execute compiler 730. Compilers, in general, are software programs that translate program code written in a human-readable language into a format (e.g., machine instructions) that can be read and processed by an integrated circuit device. In the example of FIG. 7, acceleration engine 712 includes one or more neural network accelerators 770 and compiler 730 is for compiling a neural network description into instructions to be executed on acceleration engine 712. When acceleration engine 712 implements a different type of accelerator, another compiler can be used.

Compiler 730 can be activated, for example, when operating system 720 receives keyboard, mouse, touchscreen, voice commands, or other inputs from Input/Output devices 708. The inputs can further include parameters for compiler 730, such as input code 742 to compile and configuration options for the compilation process. Once compiler 730 is activated, host processor 702 can load the instructions for compiler 730 into processor memory 704, and can execute the instructions.

In the example of FIG. 7, compiler 730 includes a first stage 732, a second stage 736, and a third stage 740, which each perform different operations to produce compiled code 744. In other examples, compiler 730 can combine the operations of first stage 732, second stage 736, and/or third stage 740 into fewer stages, or can divide the operations of one of the stages into multiple stages.

First stage 732 can receive and process input code 742. Input code 742 can describe a program in a high-level programming language, such as Java, C++, or Tensorflow, among many other examples. Input code 742 can describe, for example, steps to perform image recognition, speech recognition, machine translation, or other operations. Input code 742 can be obtained, for example, from storage device 706. Alternatively, though not illustrated here, input code 742 may be located in processor memory 704 or can be obtained from a network location, using network interface 710. Processing of input code 742 can include sorting the operations described in input code 742 into layers, where the outputs of one layer provide the inputs to a next layer. Processing can also include identifying steps to be performed by host processor 702, rather than by acceleration engine 712. For example, host processor 702, through the execution of a driver 722, may need to perform steps such as configuring Direct Memory Access (DMA) descriptors for moving data between different types of memory on acceleration engine 712, among other examples.

The output 734 of first stage 732 can be organized, for example, in the layers, nodes, and connections between nodes of a neural network. Second stage 736 can perform intermediate processing on this output 734. For example, the operations performed in any one layer, or at any one node in a layer, may be too many for acceleration engine 712 to perform at the same time. Acceleration engine 712 may, for example, have a limited amount of local storage space for the data needed for a computation, or the computations may be more than acceleration engine 712 can perform at one time. In this example, first stage 732 can break the operations of the layer or node down into smaller operations, which can fit into the acceleration engine's local memory and/or can fit into the computing capacity of acceleration engine 712. Processing of the output 734 of first stage 732 can include other steps, such as scheduling, or determining the order in which acceleration engine 712 and/or host processor 702 will perform operations, among other examples.

In various examples, output 738 of second stage 736 includes the various steps to be performed by components of acceleration engine 712, in the order that the steps are to be performed. Output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 740 can operate on output 738 of second stage 736, and perform various steps before producing the instructions that are to be executed by acceleration engine 712. These steps can include, for example, removing redundant dependencies, resolving or handling dependencies between nodes by inserting synchronization instructions into the code, identifying possible optimizations in memory usage or memory bandwidth usage, and other operations.

The output of third stage 740 is compiled code 744, which may include machine instructions in binary format. In some examples, compiled code 744 can be stored in processor memory 704. Alternatively or additionally, compiled code 744 can be copied to storage device 706 or to a network location. As noted above, acceleration engine 712 may be located at a different host system, in which case compiled code 744 can be sent over network interface 710 to the other host system.

In some embodiments, each of accelerators 770 may include one or more low-latency (or lower-latency) memories (e.g., SRAM) for storing values that are generated during the execution of compiled code 744 on accelerators 770. In some embodiments, acceleration engine 712 may further include a memory 772 that may be a high-latency (or higher-latency) memory (e.g., DRAM) for storing any of the values that are unable to be stored in the low-latency memories of accelerators 770. In some embodiments, compiler 730 may generate compiled code 744 that includes memory location assignments indicating where each value that is generated during the execution of compiled code 744 is to be stored.

In the example of FIG. 7, host system 700 can execute a driver 722, which can also be referred to as a device driver or runtime driver, that manages acceleration engine 712. Driver 722 can provide an interface between applications executing on host system 700 (or on another host system) and acceleration engine 712. For example, driver 722 can provide an Application Program Interface (API) that defines functions for feeding input data to acceleration engine 712 and defining the operation to perform on the input data. In this and other examples, driver 722 can configure acceleration engine 712 to perform the operation. For example, driver 722 can identify a neural network that acceleration engine 712 is to execute, as well as the location in processor memory 704 or on storage device 706 where compiled code 744 for the neural network is located. Driver 722 can further load into acceleration engine 712 or cause acceleration engine 712 to load compiled code 744, can load or cause acceleration engine 712 to load the input data on which the neural network is to operate, and/or can cause acceleration engine 712 to begin executing on the input data. Once acceleration engine 712 has finished, acceleration engine 712 can notify driver 722, and driver 722 can deliver a result back to the application that requested the result.

Figure 8:
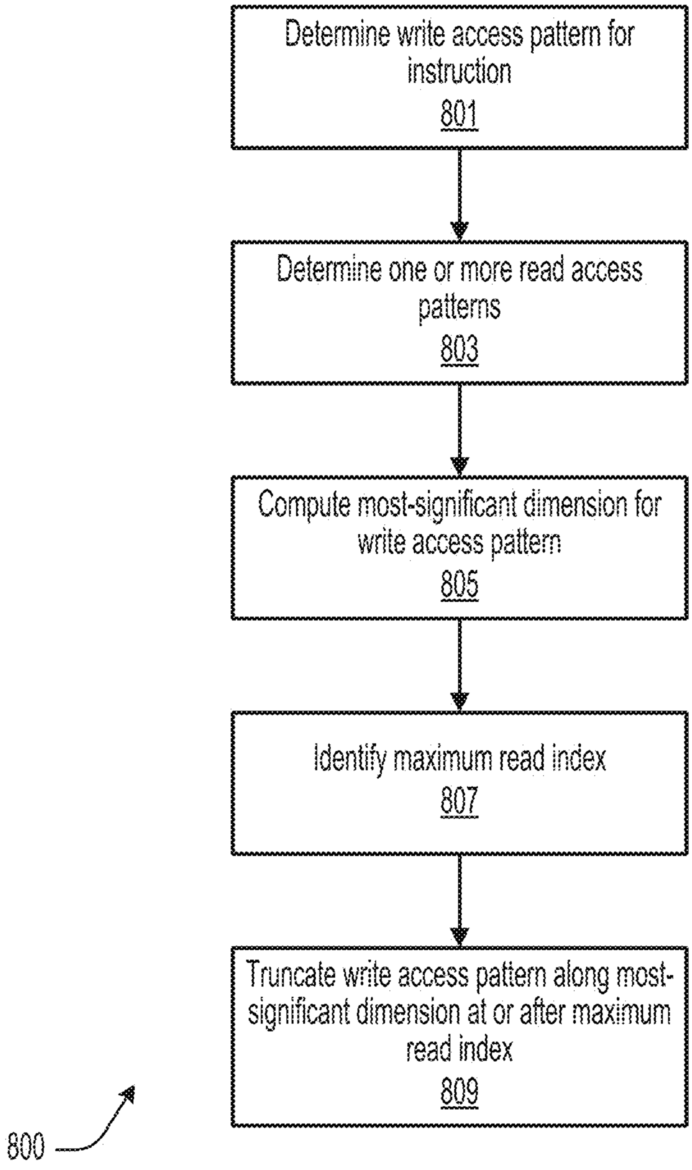
FIG. 8 illustrates a method for truncating memory access patterns.

FIG. 8 illustrates a method 800 for truncating memory access patterns, in accordance with some embodiments of the present disclosure. Steps of method 800 may be performed in any order and/or in parallel, and one or more steps of method 800 may be optionally performed. One or more steps of method 800 may be performed by one or more processors, such as those included in a host system. Method 800 may be implemented as a computer-readable medium or computer program product comprising instructions which, when the program is executed by one or more processors, cause the one or more processors to carry out the steps of method 800.

At step 801, a write access pattern (e.g., access patterns 106, 206, 306, 406, 506) for an instruction (e.g., instructions 104, 404) from a set of memory access instructions is determined. The write access pattern may indicate which of a set of memory elements (e.g., memory elements 318, 418, 518) of a memory region of a memory (e.g., memories 372, 472, 572, 772) are written to during execution of the instruction. The write access pattern may include a step size (e.g., step sizes 214) and an access number (e.g., access numbers 216) for each of a plurality of dimensions. The step size may be a number of memory elements that are skipped between successive memory accesses in a particular dimension. The access number may be a number of memory accesses in the particular dimension. The write access pattern may include at least three dimensions. Step 801 may be performed by a compiler (e.g., compilers 130, 730) running on a host system (e.g., host system 700).

At step 803, one or more read access patterns (e.g., access patterns 106, 206, 306, 406, 506) for one or more read instructions from the set of memory access instructions are determined. The one or more read access patterns may indicate which of the set of memory elements of the memory region are read from during execution of the set of memory access instructions. Step 803 may be performed by the compiler.

At step 805, a most-significant dimension for the write access pattern is computed. The most-significant dimension for the write access pattern may be computed as the dimension of the plurality of dimensions having a maximum step size. Step 805 may be performed by the compiler.

At step 807, a maximum read index (e.g., maximum read indices 424, 524) of the set of memory elements that is read from by the one or more read access patterns is identified. Step 807 may be performed by the compiler.

At step 809, the write access pattern is truncated along the most-significant dimension for the write access pattern at or after the maximum read index to generate a truncated write access pattern (e.g., truncated access patterns 406C, 406E, 506B, 506D). In some examples, method 800 may include truncating the write access pattern using a minimum access number that allows the write access pattern to still write to the maximum read index. The minimum access number for the write access pattern in the most-significant dimension for the write access pattern may be computed prior to step 809. In some examples, the write access pattern is truncated along the most-significant dimension for the write access pattern to a value between the minimum access number and an initial access number. Step 809 may be performed by the compiler.

In some examples, method 800 may include computing a most-significant dimension for a read access pattern of the one or more read access patterns. In some examples, method 800 may include modifying the read access pattern along the most-significant dimension for the read access pattern to match a total number of memory elements read with a total number of memory elements written. In some examples, method 800 may include determining whether the read access pattern and the write access pattern are contiguous. In some examples, method 800 may include in response to determining that the read access pattern and the write access pattern are contiguous, truncating the write access pattern along the most-significant dimension for the write access pattern at the maximum read index to generate the truncated write access pattern.

Figure 9:
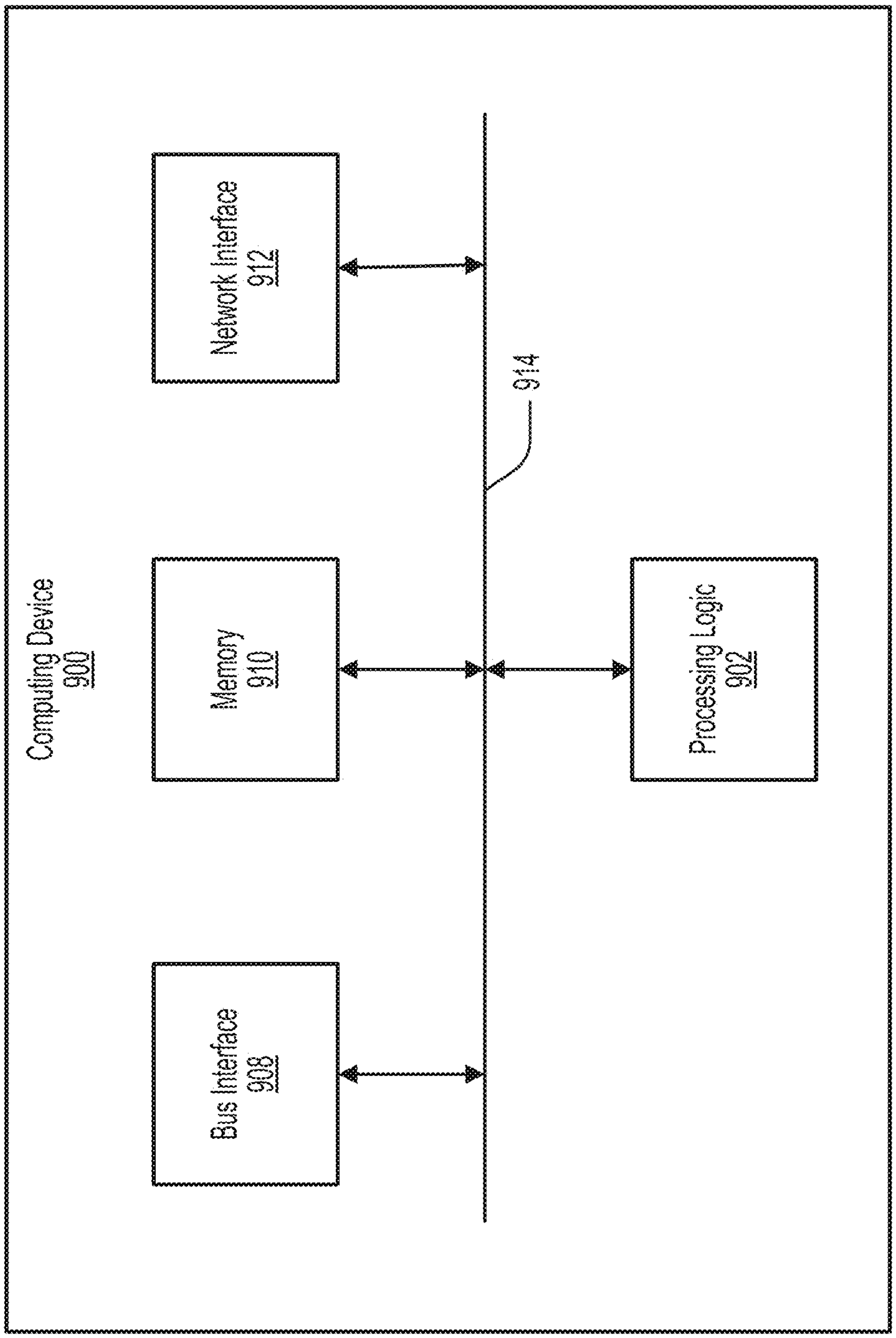
FIG. 9 illustrates an example of a computing device.

FIG. 9 illustrates an example of a computing device 900. Functionality and/or several components of computing device 900 may be used without limitation with other embodiments disclosed elsewhere in this disclosure, without limitations. For example, computing device 900 may execute a compiler or may execute the compiled code that is generated by the compiler. A computing device 900 may perform computations to facilitate processing of a task. As an illustrative example, computing device 900 can be part of a server in a multi-tenant compute service system. Various hardware and software resources of computing device 900 (e.g., the hardware and software resources associated with provision of an image recognition service) can be allocated to a client upon request.

In one example, computing device 900 may include processing logic 902, a bus interface module 908, memory 910, and a network interface module 912. These modules may be hardware modules, software modules, or a combination of hardware and software. In certain instances, modules may be interchangeably used with components or engines, without deviating from the scope of the disclosure. Computing device 900 may include additional modules, not illustrated here. In some implementations, computing device 900 may include fewer modules. In some implementations, one or more of the modules may be combined into one module. One or more of the modules may be in communication with each other over a communication channel 914. Communication channel 914 may include one or more busses, meshes, matrices, fabrics, a combination of these communication channels, or some other suitable communication channel.

Processing logic 902 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by processing logic 902 may be stored on a computer-readable storage medium, for example, in the form of a computer program. The computer-readable storage medium may be non-transitory. In some cases, the computer-readable medium may be part of memory 910. Processing logic 902 may also include hardware circuities for performing artificial neural network computation including, for example, a neural network processor, etc.

The access to processing logic 902 can be granted to a client to provide the personal assistant service requested by the client. For example, computing device 900 may host a virtual machine, on which an image recognition software application can be executed. The image recognition software application, upon execution, may access processing logic 902 to predict, for example, an object included in an image. As another example, access to processing logic 902 can also be granted as part of bare-metal instance, in which an image recognition software application executing on a client device (e.g., a remote computer, a smart phone, etc.) can directly access processing logic 902 to perform the recognition of an image.

Memory 910 may include either volatile or non-volatile, or both volatile and non-volatile types of memory. Memory 910 may, for example, include random access memory (RAM), read only memory (ROM), Electrically Erasable Programmable Read-Only Memory (EEPROM), flash memory, and/or some other suitable storage media. In some cases, some or all of memory 910 may be internal to computing device 900, while in other cases some or all of the memory may be external to computing device 900. Memory 910 may store an operating system comprising executable instructions that, when executed by processing logic 902, provides the execution environment for executing instructions providing networking functionality for computing device 900. Memory 910 may also store, for example, software applications for performing artificial neural network computation. For example, memory 910 may store software routines related to the computations of the equations above. In a case where processing logic 902 is in the form of FPGA, memory 910 may store netlists data representing various logic circuit components of processing logic 902.

Bus interface module 908 may enable communication with external entities, such as a host device and/or other components in a computing system, over an external communication medium. Bus interface module 908 may include a physical interface for connecting to a cable, socket, port, or other connection to the external communication medium. Bus interface module 908 may further include hardware and/or software to manage incoming and outgoing transactions. Bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. Bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

Network interface module 912 may include hardware and/or software for communicating with a network. This network interface module 912 may, for example, include physical connectors or physical ports for wired connection to a network, and/or antennas for wireless communication to a network. Network interface module 912 may further include hardware and/or software configured to implement a network protocol stack. Network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, computing device 900 may include multiple network interface modules, each configured to communicate with a different network. For example, in these implementations, computing device 900 may include a network interface module for communicating with a wired Ethernet network, a wireless 802.11 network, a cellular network, an Infiniband network, etc. In some embodiments, computing device 900 may receive a set of parameters, such as the aforementioned weight vectors for generation of forget gate factor, input factor, output factor, etc. from a server through network interface module 912.

The various components and modules of computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:

a host processor; and a non-transitory computer-readable medium storing a compiler configured to translate input code into compiled code to be executed on a target processor, the target processor coupled to a memory having a set of memory regions each having a set of memory elements, wherein, when the compiler is executed by the host processor, the compiler is configured to:

generate a set of instructions based on the input code, the set of instructions including a set of memory access instructions each having an initial memory access pattern;

for each instruction of one or more of the set of memory access instructions:

determine an initial write access pattern for the instruction indicating which of the set of memory elements of a memory region are written to during execution of the instruction;

determine one or more initial read access patterns indicating which of the set of memory elements of the memory region are read from during execution of the set of memory access instructions;

compute a most-significant dimension for the initial write access pattern;

identify a maximum read index of the set of memory elements that is read from by the one or more initial read access patterns; and truncate the initial write access pattern along the most-significant dimension for the initial write access pattern at or after the maximum read index to generate a truncated write access pattern;

generate the compiled code including the one or more of the set of memory access instructions each having the truncated write access pattern.

2. The system of claim 1, further comprising:

the target processor and the memory, wherein the target processor is configured to execute the compiled code including the one or more of the set of memory access instructions each having the truncated write access pattern.

3. The system of claim 1, wherein the initial write access pattern includes a step size and an access number for each of a plurality of dimensions, the step size being a number of memory elements that are skipped between successive memory accesses in a particular dimension and the access number being a number of memory accesses in the particular dimension, and wherein the most-significant dimension for the initial write access pattern is computed as the dimension of the plurality of dimensions having a maximum step size.

4. The system of claim 1, wherein the compiler is further configured to:

for each instruction of one or more of the set of memory access instructions:

compute a most-significant dimension for an initial read access pattern of the one or more initial read access patterns; and modify the initial read access pattern along the most-significant dimension for the initial read access pattern to match a total number of memory elements read with a total number of memory elements written.

5. A computer-implemented method, comprising:

determining a write access pattern for an instruction from a set of memory access instructions, the write access pattern indicating which of a set of memory elements of a memory region of a memory are written to during execution of the instruction;

determining one or more read access patterns indicating which of the set of memory elements of the memory region are read from during execution of the set of memory access instructions;

computing a most-significant dimension for the write access pattern;

identifying a maximum read index of the set of memory elements that is read from by the one or more read access patterns; and truncating the write access pattern along the most-significant dimension for the write access pattern at or after the maximum read index to generate a truncated write access pattern.

6. The computer-implemented method of claim 5, wherein the write access pattern includes a step size and an access number for each of a plurality of dimensions, the step size being a number of memory elements that are skipped between successive memory accesses in a particular dimension and the access number being a number of memory accesses in the particular dimension, and wherein the most-significant dimension for the write access pattern is computed as the dimension of the plurality of dimensions having a maximum step size.

7. The computer-implemented method of claim 5, further comprising:

computing a most-significant dimension for a read access pattern of the one or more read access patterns.

8. The computer-implemented method of claim 7, further comprising:

modifying the read access pattern along the most-significant dimension for the read access pattern to match a total number of memory elements read with a total number of memory elements written.

9. The computer-implemented method of claim 7, further comprising:

determining whether the read access pattern and the write access pattern are contiguous; and in response to determining that the read access pattern and the write access pattern are contiguous, truncating the write access pattern along the most-significant dimension for the write access pattern at the maximum read index to generate the truncated write access pattern.

10. The computer-implemented method of claim 5, further comprising:

computing a minimum access number for the write access pattern in the most significant dimension for the write access pattern that allows the write access pattern to still write to the maximum read index;

wherein the write access pattern is truncated along the most-significant dimension for the write access pattern based on the minimum access number.

11. The computer-implemented method of claim 10, wherein the write access pattern is truncated along the most-significant dimension for the write access pattern to a value between the minimum access number and an initial access number.

12. The computer-implemented method of claim 5, wherein the write access pattern includes at least three dimensions.

13. The computer-implemented method of claim 5, wherein the memory includes a set of partitions that can be read from or written to in parallel.

14. A non-transitory computer-readable medium comprising instructions that, when executed by one or more processors, cause the one or more processors to perform operations comprising:

determining a write access pattern for an instruction from a set of memory access instructions, the write access pattern indicating which of a set of memory elements of a memory region of a memory are written to during execution of the instruction;

determining one or more read access patterns indicating which of the set of memory elements of the memory region are read from during execution of the set of memory access instructions;

computing a most-significant dimension for the write access pattern;

identifying a maximum read index of the set of memory elements that is read from by the one or more read access patterns; and truncating the write access pattern along the most-significant dimension for the write access pattern at or after the maximum read index to generate a truncated write access pattern.

15. The non-transitory computer-readable medium of claim 14, wherein the write access pattern includes a step size and an access number for each of a plurality of dimensions, the step size being a number of memory elements that are skipped between successive memory accesses in a particular dimension and the access number being a number of memory accesses in the particular dimension, and wherein the most-significant dimension for the write access pattern is computed as the dimension of the plurality of dimensions having a maximum step size.

16. The non-transitory computer-readable medium of claim 14, wherein the operations further comprise:

computing a most-significant dimension for a read access pattern of the one or more read access patterns.

17. The non-transitory computer-readable medium of claim 16, wherein the operations further comprise:

modifying the read access pattern along the most-significant dimension for the read access pattern to match a total number of memory elements read with a total number of memory elements written.

18. The non-transitory computer-readable medium of claim 16, wherein the operations further comprise:

determining whether the read access pattern and the write access pattern are contiguous; and in response to determining that the read access pattern and the write access pattern are contiguous, truncating the write access pattern along the most-significant dimension for the write access pattern at the maximum read index to generate the truncated write access pattern.

19. The non-transitory computer-readable medium of claim 14, wherein the operations further comprise:

computing a minimum access number for the write access pattern in the most-significant dimension for the write access pattern that allows the write access pattern to still write to the maximum read index;

wherein the write access pattern is truncated along the most-significant dimension for the write access pattern based on the minimum access number.

20. The non-transitory computer-readable medium of claim 19, wherein the write access pattern includes at least three dimensions.

* * * * *